(12) United States Patent
Suzuki et al.

(10) Patent No.: US 8,999,083 B2
(45) Date of Patent: Apr. 7, 2015

(54) ALUMINUM ALLOY FIN MATERIAL FOR HEAT EXCHANGER AND METHOD OF PRODUCTION OF SAME AND METHOD OF PRODUCTION OF HEAT EXCHANGER BY BRAZING FIN MATERIAL

(75) Inventors: Hideki Suzuki, Shizuoka (JP); Tomohiro Sasaki, Shizuoka (JP); Masae Nagasawa, Shizuoka (JP); Nobuki Takahashi, Tokyo (JP)

(73) Assignee: Nippon Light Metal Company, Ltd., Tokyo (JP)

( * ) Notice: Subject to any disclaimer, the term of this patent is extended or adjusted under 35 U.S.C. 154(b) by 622 days.

(21) Appl. No.: 12/375,798

(22) PCT Filed: Jun. 8, 2007

(86) PCT No.: PCT/JP2007/062069
§ 371 (c)(1),
(2), (4) Date: Jan. 30, 2009

(87) PCT Pub. No.: WO2008/015846
PCT Pub. Date: Feb. 7, 2008

(65) Prior Publication Data
US 2009/0308500 A1 Dec. 17, 2009

(30) Foreign Application Priority Data

Aug. 2, 2006 (JP) .................................. 2006-210797

(51) Int. Cl.
| | | |
|---|---|---|
| C21D 9/08 | (2006.01) | |
| C22F 1/04 | (2006.01) | |
| B22D 17/00 | (2006.01) | |
| C22C 21/06 | (2006.01) | |
| C22C 21/00 | (2006.01) | |
| B32B 15/01 | (2006.01) | |
| C22C 21/10 | (2006.01) | |
| C22F 1/00 | (2006.01) | |
| C22F 1/053 | (2006.01) | |

(52) U.S. Cl.
CPC . *C22C 21/10* (2013.01); *C22F 1/00* (2013.01); *C22F 1/053* (2013.01)

(58) Field of Classification Search
None
See application file for complete search history.

(56) References Cited

U.S. PATENT DOCUMENTS

| 6,610,247 B2 * | 8/2003 | Wittebrood et al. ........... 420/548 |
| 2003/0015573 A1 * | 1/2003 | Kawahara et al. ............ 228/183 |
| 2004/0209105 A1 | 10/2004 | Wittebrood |
| 2005/0034793 A1 * | 2/2005 | Henry et al. .................. 148/551 |

FOREIGN PATENT DOCUMENTS

| CA | 2553910 | * | 8/2005 | ................ B21B 3/00 |
| JP | 1-91962 A | | 4/1989 | |
| JP | 2-142672 A | | 5/1990 | |
| JP | 2000-84661 A | | 3/2000 | |
| JP | 2005-002383 | * | 1/2005 | ................ C22F 1/04 |
| JP | 2005-2383 A | | 1/2005 | |
| JP | 2005-002383 | * | 6/2005 | ................ C22F 1/04 |
| JP | 2005-220375 A | | 8/2005 | |
| JP | 2007-31778 A | | 2/2007 | |

OTHER PUBLICATIONS

English translation of JP 2005-002383.*
English translation of P 2005-002383 (2005).*
International Search Report of PCT/JP2007/062069, Sep. 5, 2007.
Office Action issued on May 21, 2010 with English Translation—Notification of First Office Action mailed on May 21, 2010—Chinese Application No. 200780028852.X—Nippon Light Metal Company, Ltd. "Aluminum Alloy Fin Material for Heat Exchanger, Process for Manufacturing the Same, Process for Manufacturing Heat Exchanger Through Brazing of the Fin Material".

* cited by examiner

*Primary Examiner* — Yoshitoshi Takeuchi
(74) *Attorney, Agent, or Firm* — Millen, White, Zelano & Branigan, P.C.

(57) ABSTRACT

An aluminum alloy fin material for a heat exchanger having suitable strength before brazing enabling easy fin formation, having high strength after brazing, having a high thermal conductivity (electrical conductivity) after brazing, and having superior sag resistance, erosion resistance, self corrosion prevention, and sacrificial anode effect, a method of production of the same, and a method of production of a heat exchanger using the fin material are provided, that is, an aluminum alloy fin material having a chemical composition of Si: 0.7 to 1.4 wt %, Fe: 0.5 to 1.4 wt %, Mn: 0.7 to 1.4 wt %, and Zn: 0.5 to 2.5 wt %, Mg as an impurity limited to 0.05 wt % or less, and the balance of unavoidable impurities and Al, and having a tensile strength after brazing of 130 MPa or more, a yield strength after brazing of 45 MPa or more, a recrystallized grain size after brazing of 500 μm or more, and an electrical conductivity after brazing of 47% IACS or more, a method of producing an aluminum alloy fin material comprising cold rolling/annealing/cold rolling/annealing/cold rolling a thin slab continuously cast by a twin-belt system from a melt of the above composition under predetermined conditions, and a method of production of a heat exchanger comprising cooling the fin material at a predetermined rate after brazing heating.

5 Claims, No Drawings

ALUMINUM ALLOY FIN MATERIAL FOR HEAT EXCHANGER AND METHOD OF PRODUCTION OF SAME AND METHOD OF PRODUCTION OF HEAT EXCHANGER BY BRAZING FIN MATERIAL

TECHNICAL FIELD

The present invention relates to an aluminum alloy fin material for a heat exchanger and a method of production of the same and a method of production of a heat exchanger by brazing a fin material.

BACKGROUND ART

An aluminum heat exchanger is comprised of an aluminum alloy fin material brazed to an aluminum material forming working fluid passages and the like. To improve the performance characteristics of the heat exchanger, as basic characteristics of this aluminum alloy fin material, a sacrificial anode effect has been demanded in order to prevent corrosion of the material forming the working fluid passages. Further, to prevent deformation due to high-temperature brazing heating and penetration of the brazing material, a superior sag resistance and erosion resistance have been demanded.

The fin material, in order to satisfy the above basic characteristics, has Mn and Fe added to it. Recently, however, effort has been focused on the production process and aluminum alloy fins for heat exchangers with a low tensile strength before brazing and a high tensile strength after brazing have been developed.

Japanese Patent Publication (A) No. 2005-220375 discloses a method of production of an aluminum alloy fin for a heat exchanger having a tensile strength before brazing of 240 MPa or less and a tensile strength after brazing of 150 MPa or more comprising pouring a melt containing Si: 0.8 to 1.4 wt %, Fe: 0.15 to 0.7 wt %, Mn: 1.5 to 3.0 wt %, and Zn: 0.5 to 2.5 wt %, limiting Mg as an impurity to 0.05 wt % or less, and having a balance of normal impurities and Al, continuously casting a thin slab of a thickness of 5 to 10 mm by a twin-belt casting machine, taking it up in a roll, then cold rolling it to a sheet thickness of 0.05 to 0.4 mm, process annealing the sheet at 350 to 500° C., and cold rolling it by a cold rolling reduction of 10 to 50% to a final sheet thickness of 40 to 200 μm.

On the other hand, a method of production of a heat exchanger has been developed which obtains a predetermined strength by defining the cooling rate after brazing when brazing an aluminum alloy fin material to an aluminum material forming working fluid passages.

Japanese Patent Publication (A) No. 1-91962 discloses a method of production of a heat exchanger taking note of the cooling rate after brazing heating and obtaining fins with a large tensile strength after brazing heating. Specifically, this is a method of production of a heat exchanger fabricating an Al heat exchanger by brazing during which performing the cooling from the brazing temperature to 350° C. by a cooling rate of 100° C./min to 1000° C./min so as to obtain fins of a large tensile strength.

Japanese Patent Publication (A) No. 2-142672 discloses a method of production of an aluminum heat exchanger obtained by stacking tubes and fins, attaching headers to both ends of the tubes, and brazing the pieces using a chloride-based flux in the atmosphere, in dry air, or using a fluoride-based non-corrosive flux in an inert gas atmosphere, said method of production of an aluminum heat exchanger characterized by using a brazing sheet to fabricate tubes with an outer surface comprised of an Al—Si-based alloy brazing material and with an inner surface comprised of an Al—Zn-based alloy and cooling from 500° C. to 200° C. after brazing them together at a rate of 50° C./min or more.

However, said Japanese Patent Publication (A) No. 2005-220375 has a description regarding the electrical conductivity after brazing heating (thermal conductivity), but no description particularly relating to the cooling rate after the brazing heating can be found.

Further, said Japanese Patent Publication (A) No. 1-91962 and Japanese Patent Publication (A) No. 2-142672 disclose art defining the cooling rate after brazing heating to obtain a high strength fin material, but no description relating to the electrical conductivity (thermal conductivity) after the brazing heating can be found.

Further, recently, to make the fin material thinner, development of an aluminum alloy fin material with not only the basic brazing characteristics, but also a high yield strength after brazing and superior in thermal conductivity after brazing has been hoped for.

DISCLOSURE OF THE INVENTION

An object of the present invention is to provide an aluminum alloy fin material for a heat exchanger having suitable strength before brazing enabling easy fin formation, having high strength after brazing, having a high thermal conductivity (electrical conductivity) after brazing, and having superior sag resistance, erosion resistance, self corrosion prevention, and sacrificial anode effect, a method of production of the same, and a method of production of a heat exchanger using the fin material.

To attain the above object, according to the present invention, there is provided an aluminum alloy fin material for a heat exchanger having a high strength and heat transfer characteristic, erosion resistance, sag resistance, a sacrificial anode effect, and self corrosion prevention characterized by having a chemical composition of Si: 0.7 to 1.4 wt %, Fe: 0.5 to 1.4 wt %, Mn: 0.7 to 1.4 wt %, Zn: 0.5 to 2.5 wt %, Mg as an impurity limited to 0.05 wt % or less, and the balance of unavoidable impurities and Al, and having a tensile strength after brazing of 130 MPa or more, a yield strength after brazing of 45 MPa or more, a recrystallized grain size after brazing of 500 μm or more, and an electrical conductivity after brazing of 47% IACS or more.

The method of producing the fin material of the present invention is characterized by pouring a melt having the chemical composition of said fin material, continuously casting it by a twin-belt casting machine to a thin slab of a thickness of 5 to 10 mm, winding it up into a roll, performing first stage cold rolling to a sheet thickness of 1.0 to 6.0 mm, performing primary intermediate annealing at 250 to 550° C., performing second stage cold rolling to a sheet thickness of 0.05 to 0.4 mm, performing secondary intermediate annealing at 360 to 550° C., and performing final cold rolling at a reduction of 20 to 75% to a final sheet thickness of 40 to 200 μm.

Further, the present inventors reached the conclusion that in order to obtain a fin material having a high yield strength after brazing and having superior thermal conductivity after brazing, along with the production process of the fin material itself, it is important to control the cooling rate after brazing the fin material to the heat exchanger to a suitable range.

That is, the present invention provides a method of producing an aluminum heat exchanger by brazing heating the fin material of the present invention characterized by cooling in the temperature range from at least the brazing temperature after said brazing heating to 400° C. at a cooling rate of 10 to 50° C./min.

The aluminum alloy fin material for a heat exchanger of the present invention defines the composition and yield strength after brazing, recrystallized grain size after brazing, and electrical conductivity after brazing, so can ensure a high strength and superior heat transfer characteristics, erosion resistance, sag resistance, sacrificial anode effect, and self corrosion prevention.

The method of production of the fin material of the present invention uses a melt of the chemical composition of the fin material of the present invention to obtain a thin slab by a twin-belt casting machine and cold rolls/anneals/cold rolls/anneals/cold rolls it so as to produce a fin material provided with the above characteristics.

The method of production of a heat exchanger of the present invention defines the cooling rate after brazing the fin material of the present invention to cause the precipitation of Al—Mn precipitates and Al—(Fe,Mn)—Si-based precipitates, so can achieve a high electrical conductivity after brazing.

BEST MODE FOR CARRYING OUT THE INVENTION

The reasons for limiting the chemical composition of the aluminum alloy fin material for a heat exchanger of the present invention will be explained next.

[Si: 0.7 to 1.4 wt %]

Si together with Fe and Mn forms submicron level Al—(Fe,Mn)—Si-based compounds during brazing, increases the strength, and at the same time decreases the amount of solid solution of Mn to increase the thermal conductivity (electrical conductivity). If the content of Si is less than 0.7 wt %, this effect is not sufficient, while if over 1.4 wt %, the fin material is liable to melt during brazing. Therefore, Si content is limited to 0.7 to 1.4 wt %. Preferably the Si content is 0.8 to 1.2 wt %.

[Fe: 0.5 to 1.4 wt %]

Fe together with Mn and Si forms submicron level Al—(Fe,Mn)—Si-based compounds during brazing, increases the strength, and at the same time decreases the amount of solid solution of Mn to increase the thermal conductivity (electrical conductivity). If the content of Fe content is less than 0.5 wt %, the strength deteriorates, so this is not preferable. If over 1.4 wt %, coarse Al—(Fe,Mn)—Si-based precipitates are formed during the casting of the alloy and the production of sheet material becomes difficult. Therefore, the Fe content is limited to 0.5 to 1.4 wt %. Preferably the Fe content is 0.5 to 1.2 wt %.

[Mn: 0.7 to 1.4 wt %]

Mn together with Fe and Si precipitates as submicron level Al—(Fe,Mn)—Si-based compounds in a high density during brazing and improves the strength of the alloy material after brazing. Further, the submicron level Al—(Fe,Mn)—Si-based precipitate has a strong recrystallization inhibiting action, so the recrystallized grains becomes coarse ones of 500 μm or more and the sag resistance and erosion resistance are improved. If Mn is less than 0.7 wt %, this effect is insufficient, while if over 1.4 wt %, coarse Al—(Fe,Mn)—Si-based precipitates are formed during casting of the alloy and production of the sheet material becomes difficult, the amount of solid solution of Mn increases, and the thermal conductivity (electrical conductivity) deteriorates. Therefore, the Mn content is limited to 0.7 to 1.4 wt %. Preferably the Mn content is 0.8 to 1.3 wt %.

[Zn: 0.5 to 2.5 wt %]

Zn lowers the potential of the fin material and gives a sacrificial anode effect. If the content is less than 0.5 wt %, this effect is not sufficient, while if over 2.5 wt %, the self corrosion prevention of the material deteriorates. In addition, due to the solid solution of Zn, the thermal conductivity (electrical conductivity) deteriorates. Therefore, the Zn content is limited to 0.5 to 2.5 wt %. Preferably the Zn content is 1.0 to 2.0 wt %.

[Mg: 0.05 wt % or less]

Mg is an impurity which influences brazeability and, if the content is over 0.05 wt %, is liable to impair the brazeability. Especially in the case of fluoride-based flux brazing, the flux ingredient, that is, the fluorine (F), and the Mg in the alloy easily react and $MgF_2$ and other compounds are formed. Due to this, the absolute amount of flux effectively acting at the time of brazing becomes insufficient and brazing defects easily occur. Therefore, the Mg content is limited to 0.05 wt % or less.

Regarding impurity ingredients other than Mg, Cu makes the potential of the material more precious, so is preferably limited to 0.2 wt % or less, while Cr, Zr, Ti, and V, even in trace amounts, cause the coefficient of thermal conductivity of the material to remarkably reduce, so the total content of these elements is preferably limited to 0.20 wt % or more.

Next, the reasons for limitation of the conditions in a method of production of an aluminum alloy fin material for a heat exchanger of the present invention will be explained.

[Continuously Casting Thin Slab of Thickness of 5 to 10 mm by Twin-Belt Casting Machine]

The twin-belt casting method is a continuous casting method comprising pouring a melt between water cooled rotary belts facing each other in the vertical direction, solidifying the melt by cooling from the belt surfaces to obtain a slab, and continuously pulling out the slab from the opposite side of the belts from the pouring side and winding it up in a coil.

In the method of production of the present invention, the thickness of the casting slab is limited to 5 to 10 mm. With this thickness, the solidification rate of the center part of the sheet thickness is so fast that it is possible to obtain a fin material with few coarse compounds and with a large crystal grain size and superior properties after brazing under the condition of a uniform structure and a composition in the scope of the present invention.

If the thickness of the thin slab formed by the twin-belt casting machine is less than 5 mm, the amount of aluminum passing through the casting machine per unit time becomes too small and casting becomes difficult. Conversely, if the thickness is over 10 mm, winding by a roll becomes impossible, so the range of the slab thickness is limited to 5 to 10 mm.

Note that the casting speed during solidification of the melt is preferably 5 to 15 m/min and solidification preferably is completed in the belts. If the casting speed is less than 5 m/min, the casting takes too much time and the productivity reduces, so this is not preferable. If the casting speed is over 15 m/min, the aluminum melt cannot be supplied fast enough and obtaining a predetermined shape of a thin slab becomes difficult.

Under the above casting conditions, the slab cooling rate (solidification rate) at a position of ¼ thickness of the slab during casting is 20 to 150° C./sec or so. By the melt solidifying with a comparatively fast cooling rate in this way, in the scope of the chemical composition of the present invention, the size of the intermetallic compounds such as Al—(Fe, Mn)—Si precipitating at the time of casting can be controlled to 1 µm or less and the amounts of Fe, Si, Mn, and other elements in the matrix as solid solution can be increased.

[First Stage Cold Rolling to Sheet Thickness of 1.0 to 6.0 mm]

Next, to obtain a sufficient softened state in the primary process annealing and to sufficiently cause the precipitation of Si, Fe, Mn, and other solid solution elements in the matrix, the sheet thickness after the first stage cold rolling is limited to 1.0 to 6.0 mm. If a sheet thickness thicker than 6.0 mm, the effect is not sufficient, while if less than 1.0 mm, edge cracking etc. occur at the time of the first stage cold rolling and the rollability otherwise falls. Further, gauge control is necessary to obtain a balance between the reduction of the subsequent second stage cold rolling and the reduction of the final cold rolling.

[Primary Intermediate Annealing at 250 to 550° C.]

The holding temperature of the primary intermediate annealing is limited to 250 to 550° C. If the holding temperature of the primary intermediate annealing is less than 250° C., a sufficiently softened state cannot be obtained. If the holding temperature of the primary intermediate annealing is over 550° C., Si, Fe, Mn, and other solid solution elements in the matrix will not sufficiently precipitate and the thermal conductivity after brazing heating (electrical conductivity) will reduce.

The holding time of the primary intermediate annealing does not particularly have to be limited, but making it a range of 1 to 5 hours is preferable. If the holding time of the primary intermediate annealing is less than 1 hour, the temperature of the coil as a whole remains uneven and a uniform microstructure may not be obtained in the sheet, so this is not preferred. If the holding time of the primary intermediate annealing is over 5 hours, the treatment takes too much time and the productivity reduces, so this is not preferable.

The heating rate and cooling rate at the time of the primary intermediate annealing do not particularly have to be limited, but making them 30° C./hr or more is preferable. If the heating rate and cooling rate at the time of the primary intermediate annealing is less than 30° C./hr, the treatment takes too much time and the productivity reduces, so this is not preferable.

The temperature of the first intermediate annealing by the continuous annealing furnace is preferably 400 to 550° C. If less than 400° C., a sufficiently softened state cannot be obtained. However, if the holding temperature is over 550° C., the Si, Fe, Mn, and other solid solution elements in the matrix will not sufficiently precipitate and the thermal conductivity (electrical conductivity) after the brazing heating will reduce.

The holding time of the continuous annealing is preferably within 5 min. If the holding time of the continuous annealing is over 5 min, the treatment takes too much time and the productivity reduces, so this is not preferable.

Regarding the heating rate and cooling rate at the time of continuous annealing, the rate of temperature rise is preferably 100° C./min or more. If the rate of temperature rise during the continuous annealing is less than 100° C./min, the treatment takes too long and the productivity reduces, so this is not preferable.

[Second Stage Cold Rolling to Sheet Thickness of 0.05 to 0.4 mm]

Second stage cold rolling is necessary in order to obtain a sufficiently softened state in the subsequent secondary intermediate annealing and in order to make the Si, Fe, Mn, and other solid solution elements in the matrix sufficiently precipitate.

If the sheet thickness is over 0.4 mm, this effect is not sufficient, while if less than 0.05 mm, it is no longer possible to control the cold rolling reduction in the subsequent final cold rolling. For this reason, the sheet thickness after second stage cold rolling is limited to 0.05 to 0.4 mm.

[Secondary Intermediate Annealing at 360 to 550° C.]

The holding temperature of the secondary intermediate annealing is limited to 360 to 550° C. If the holding temperature of the secondary intermediate annealing is less than 360° C., a sufficiently softened state cannot be obtained. However, if the holding temperature of the secondary intermediate annealing is over 550° C., the Si, Fe, Mn, and other solid solution elements in the matrix will not sufficiently precipitate, the thermal conductivity (electrical conductivity) after the brazing heating will reduce, the recrystallization inhibiting action during brazing will weaken, the recrystallized grain size will become less than 500 µm, and the sag resistance and erosion resistance at the time of brazing will deteriorate.

The holding time of the secondary intermediate annealing does not particularly have to be limited, but making it a range of 1 to 5 hours is preferable. If the holding time of the secondary intermediate annealing is less than 1 hour, the temperature of the coil as a whole remains uneven and a uniform microstructure may not be obtained in the sheet, so this is not preferred. If the holding time of the secondary intermediate annealing is over 5 hours, the treatment takes too much time and the productivity reduces, so this is not preferable.

The heating rate and cooling rate during the secondary intermediate annealing do not particularly have to be limited, but making them 30° C./hr or more is preferable. If the heating rate and cooling rate during the secondary intermediate annealing is less than 30° C./hr, the treatment takes too much time and the productivity reduces, so this is not preferable.

[Final Cold Rolling at Cold Reduction of 20 to 75% To Final Sheet Thickness of 40 to 200 µm]

<Cold Reduction: 20 to 75%>

If the cold reduction in the final cold rolling is less than 20%, there is little strain energy accumulated by the cold rolling and the recrystallization will not be completed in the process of heating during brazing, so the sag resistance and erosion resistance will reduce. If the cold reduction is over 75%, the product strength will become too high and obtaining the predetermined fin shape when shaping the fin material will become difficult. Therefore, the cold reduction in final cold rolling is limited to 20 to 75%.

<Final Sheet Thickness: 40 to 200 µm>

If the sheet thickness of the fin material is less than 40 µm, the strength of the heat exchanger is insufficient. Further, the conduction of heat in the air becomes low. If the sheet thickness of the fin material is over 200 µm, the weight of the heat exchanger becomes larger.

The sheet material produced by the method of production of an aluminum alloy fin material of the present invention is generally slit to predetermined widths, then corrugated and alternately stacked with flat tubes made of a material for working fluid passages, for example, clad sheet consisting of 3003 Alloy coated with a brazing material etc. and brazed together so as to obtain a heat exchanger unit.

The reasons for limitation of the production conditions in the method of production of a heat exchanger of the present invention will be explained next.

[Cooling in Temperature Range from at Least Brazing Temperature after Brazing Heating to 400° C. by Cooling Rate of 10 to 50° C./min]

The brazing of the aluminum heat exchanger is generally performed at 600° C. or so.

The material must be cooled in the temperature range from at least the brazing temperature after brazing heating to 400°

C. by a cooling rate of 10 to 50° C./min. Preferably the material is cooled in the temperature range from at least the brazing temperature after brazing heating to 300° C. by a cooling rate of 10 to 50° C./min. More preferably the material is cooled in the temperature range from the brazing temperature after brazing heating to 200° C. by a cooling rate of 10 to 50° C./min.

In this way, in the fin material of the present invention, the slower the cooling rate after the brazing heating, the greater the amount of precipitation of the Al—Mn precipitates and Al—(Fe,Mn)—Si-based precipitates, so an electrical conductivity after brazing of 47% IACS or more can be achieved. If the cooling rate after brazing is less than 10° C./min, the productivity of the heat exchanger remarkably reduces. If the cooling rate after brazing is over 50° C./min, an electrical conductivity after brazing of 47% IACS or more is difficult to achieve. Further, if the cooling rate is within a range of 10 to 50° C./min compared with a cooling rate after brazing of 50° C./min or more, a fin material with a high tensile strength after brazing and yield strength can be obtained.

EXAMPLES

Below, examples of the present invention will be explained in comparison with comparative examples.

First Embodiment

As invention examples and comparative examples, the alloy melts of the compositions of the alloy Nos. 1 to 9 shown in Table 1 were produced, passed through ceramic filters, and poured into twin-belt casting machines to obtain slabs of thicknesses of 7 mm by a casting speed of 8 m/min. The cooling rates during solidification of the melts at ¼ of the slab thickness was 50° C./sec. The thin slabs were cold rolled to 4 mm, heated at a heating rate of 50° C./hr, held at 400° C. for 2 hours, then cooled at a cooling rate of 50° C./hr down to 100° C. for primary intermediate annealing. Next, the sheets were cold rolled to 120 μm, heated at a heating rate of 50° C./hr, held at 400° C. for 2 hours, then cooled by a cooling rate of 50° C./hr down to 100° C. for secondary intermediate annealing. Next, the sheets were cold rolled to obtain fin materials of a thickness of 60 μm.

TABLE 1

(First Embodiment: Differences due to Chemical Composition)

| Fin material | No. | Casting | Alloy | Chemical composition (wt %) | | | | | | | Work hardening | Sheet thickness (μm) |
|---|---|---|---|---|---|---|---|---|---|---|---|---|
| | | | | Si | Fe | Cu | Mn | Mg | Zn | Ti | | |
| Ex. | 1 | B | 1 | 0.88 | 0.55 | 0.01 | 1.14 | 0.000 | 1.43 | 0.010 | H16 | 60 |
| | 2 | B | 2 | 0.93 | 0.91 | 0.02 | 0.90 | 0.010 | 1.47 | 0.010 | H16 | 60 |
| | 3 | B | 3 | 0.90 | 0.73 | 0.02 | 1.10 | 0.010 | 1.50 | 0.010 | H16 | 60 |
| Comp. Ex. | 4 | B | 4 | 0.58 | 0.70 | 0.02 | 1.09 | 0.007 | 1.48 | 0.007 | H16 | 60 |
| | 5 | B | 5 | 1.62 | 0.80 | 0.02 | 0.80 | 0.007 | 1.50 | 0.007 | H16 | 60 |
| | 6 | B | 6 | 0.91 | 0.35 | 0.02 | 1.05 | 0.007 | 1.48 | 0.007 | H16 | 60 |
| | 7 | B | 7 | 0.90 | 1.80 | 0.02 | 1.21 | 0.007 | 1.50 | 0.007 | | |
| | 8 | B | 8 | 0.89 | 0.80 | 0.02 | 0.51 | 0.007 | 1.46 | 0.007 | H16 | 60 |
| | 9 | B | 9 | 0.87 | 0.70 | 0.02 | 1.72 | 0.007 | 1.52 | 0.007 | H16 | 60 |
| | 10 | D | 10 | 0.97 | 0.51 | 0.01 | 1.21 | 0.010 | 1.58 | 0.010 | H14 | 60 |

| Fin material | No. | Before brazing (H mat.) | | Braze-ability | After brazing heating | | | |
|---|---|---|---|---|---|---|---|---|
| | | TS (MPa) | El (%) | | Grain size (μm) | TS (MPa) | PS (MPa) | Elec. cond. (% IACS) |
| Ex. | 1 | 208 | 1.9 | G | 800 | 135 | 55 | 47.2 |
| | 2 | 207 | 1.2 | G | 2200 | 133 | 51 | 48.2 |
| | 3 | 209 | 1.0 | G | 3000 | 133 | 53 | 47.4 |
| Comp. Ex. | 4 | 195 | 1.4 | G | 1400 | 126 | 43 | 47.6 |
| | 5 | | | P | No good due to erosion | | | |
| | 6 | 200 | 1.6 | G | 1700 | 129 | 47 | 46.1 |
| | 7 | | | No good due to giant crystals during casting | | | | |
| | 8 | 195 | 1.4 | G | 800 | 123 | 43 | 48.5 |
| | 9 | 248 | 0.9 | G | 3500 | 155 | 57 | 45.3 |
| | 10 | 180 | 1.3 | P | 80 | 133 | 39 | 43.3 |

(Note)

Underlined numerical values are outside the scope of the present invention.

Casting . . . B: Twin-belt casting,

D: DC casting

TS: tensile strength,

PS: yield strength,

El: elongation at break

Brazeability: erosion resistance (605° C. × 5 min)

As a comparative example, an alloy melt of the composition of the alloy No. 10 shown in Table 1 was prepared, cast by ordinary DC casting (thickness 560 mm, cooling rate during solidification of approximately 1° C./sec), surface scalped, soaked, hot rolled, cold rolled (thickness 90 μm), intermediate annealed (400° C.×2 hr), and cold rolled to produce a fin material of a thickness of 60 μm by cold rolling.

The fin materials of the invention examples and comparative example obtained were measured by the following (1) to (3):

(1) Tensile properties before brazing

Tensile strength (MPa) and elongation at break (%) of the obtained fin materials (2) Tensile properties after brazing and grain size and conductive properties

[Brazing Heating Conditions]

The materials were heated at a heating rate of 20° C./min to 600 to 605° C., held there for 3 minutes, then cooled down to 200° C. by a cooling rate of 20° C./min, then taken out from the heating furnace and cooled to room temperature.

[Test Items]

[1] Tensile strength, yield strength (MPa)

[2] Grain size

The materials were electrolytically polished on their surfaces to expose the grain structure by the Barker method, then were measured for the grain size (μm) parallel to the rolling direction by the cross-section method.

[3] Electrical conductivity [% IACS] by the conductivity test method described in JIS-H0505

(3) Brazeability (erosion test)

Fin materials worked into a corrugated shape were placed on the brazing material surfaces of brazing sheets (brazing material 4045 alloy clad rate 8%) of thicknesses of 0.25 mm coated with a non-corrosive fluoride-based flux (applied load of 215 g), heated by a heating rate of 50° C./min up to 605° C. and held there for 5 minutes. After cooling, the materials were observed at their brazed cross-sections. Materials where the erosion of the grain boundaries of the fin material was minor were judged as "good" ("G" symbol), while materials where the erosion was extreme and the fin material remarkably melted were judged as "poor" ("P" symbol). Note that the corrugated shape was made as follows:

Corrugated shape: height 2.3 mm×width 21 mm×pitch 3.4 mm, 10 peaks

The measurement results are shown in Table 1.

From the results of Table 1, it is recognized that the fin materials produced by the method of the present invention are good in each of the tensile strength of the H material, the brazeability (erosion resistance), the tensile strength after brazing, the yield strength after brazing, and the electrical conductivity after brazing.

Fin Material No. 4 of a comparative example had a low Si content and a low tensile strength after brazing, yield strength after brazing, and electrical conductivity after brazing.

Fin Material No. 5 of a comparative example had a large Si content and a poor erosion resistance in evaluation of the brazeability.

Fin Material No. 6 of a comparative example had a low Fe content and a low tensile strength after brazing and electrical conductivity after brazing.

Fin Material No. 7 of a comparative example had a large Fe content, had giant precipitates formed during casting, had cracks formed during cold rolling, and failed to give a fin material.

Fin Material No. 8 of a comparative example had a low Mn content and a low tensile strength after brazing and yield strength after brazing.

Fin Material No. 9 of a comparative example had a low Mn content, had a high tensile strength with H material (as cold rolled), and had a low electrical conductivity after brazing.

Fin Material No. 10 of a comparative example was a fin material obtained by ordinary DC casting (thickness of 560 mm, solidification cooling rate of approximately 1° C./sec), surface scalping, soaking, hot rolling, cold rolling (thickness 90 μm), process annealing (400° C.×2 hr), and cold rolling. The yield strength after brazing was low, the grain size after brazing was small, the brazeability (erosion resistance) was inferior, and the electrical conductivity after brazing was low.

Second Embodiment

As invention examples and comparative examples, fin materials of alloy no. 2 obtained by the first embodiment were cooled by various cooling rates after the brazing heating.

That is, the materials were raised in temperature by a rate of temperature rise of 20° C./min to 600 to 605° C., held there for 3 minutes, then cooled to the intermediate temperature shown in Table 2 (400° C. and 200° C.) at the cooling rates shown in Table 2 (60, 40, 30, 20, and 10° C./min), then were taken out from the heating furnace and cooled to room temperature.

These brazed heated fin materials were measured for tensile strength after brazing, yield strength after brazing, and electrical conductivity after brazing. The tensile test and measurement of the electrical conductivity were performed by similar methods as with the first embodiment. The measurement results are shown in Table 2.

TABLE 2

(Second Embodiment: Differences Due to Cooling Rate After Brazing)

| Fin material | No. | Casting | Alloy | Chemical composition (wt %) | | | | | | | Work hardening |
|---|---|---|---|---|---|---|---|---|---|---|---|
| | | | | Si | Fe | Cu | Mn | Mg | Zn | Ti | |
| Ex. | 2 | B | 2 | 0.93 | 0.91 | 0.02 | 0.90 | 0.01 | 1.47 | 0.010 | H16 |
| | 11 | B | 2 | 0.93 | 0.91 | 0.02 | 0.90 | 0.01 | 1.47 | 0.010 | H16 |
| | 12 | B | 2 | 0.93 | 0.91 | 0.02 | 0.90 | 0.01 | 1.47 | 0.010 | H16 |
| | 13 | B | 2 | 0.93 | 0.91 | 0.02 | 0.90 | 0.01 | 1.47 | 0.010 | H16 |
| | 14 | B | 2 | 0.93 | 0.91 | 0.02 | 0.90 | 0.01 | 1.47 | 0.010 | H16 |
| Comp. ex. | 15 | B | 2 | 0.93 | 0.91 | 0.02 | 0.90 | 0.01 | 1.47 | 0.010 | H16 |
| | 16 | D | 10 | 0.97 | 0.51 | 0.01 | 1.21 | 0.01 | 1.58 | 0.010 | H14 |
| | 10 | D | 10 | 0.97 | 0.51 | 0.01 | 1.21 | 0.01 | 1.58 | 0.010 | H14 |

TABLE 2-continued (Second Embodiment: Differences Due to Cooling Rate After Brazing)

| | | Sheet | Cooling | | Properties | | |
|---|---|---|---|---|---|---|---|
| Fin material | No. | thickness (μm) | Rate (° C./min) | Intermediate temp. (° C.) | TS (MPa) | PS (MPa) | Elec. cond. (% IACS) |
| Ex. | 2 | 60 | −20 | 200 | 133 | 51 | 48.2 |
| | 11 | 60 | −20 | 400 | 133 | 51 | 47.3 |
| | 12 | 60 | −10 | 400 | 131 | 49 | 49.1 |
| | 13 | 60 | −40 | 200 | 133 | 50 | 47.4 |
| | 14 | 60 | −30 | 200 | 132 | 50 | 47.3 |
| Comp. ex. | 15 | 60 | <u>−60</u> | 200 | 131 | 48 | <u>46.6</u> |
| | 16 | 60 | <u>−60</u> | 200 | 138 | <u>43</u> | <u>43.5</u> |
| | 10 | 60 | −20 | 200 | 133 | <u>39</u> | <u>43.3</u> |

(Note)
Underlined numerical values are outside the scope of the present invention.
Casting . . . B: Twin-belt casting,
D: DC casting
TS: tensile strength,
PS: yield strength As shown in Table 2, Fin Material Nos. 2, 13, and 14 produced by the method of the present invention heated by brazing under the cooling conditions after brazing heating of the method of the present invention were cooled in a temperature range from 600° C. to 200° C. by cooling rates of 20, 30, and 40° C./min, so it was recognized that good results were obtained in each of the tensile strength after the brazing heating, the yield strength after the brazing heating, the erosion resistance after the brazing heating, and the electrical conductivity after the brazing heating.

Fin Material Nos. 11 and 12 produced by the method of the present invention heated by brazing under the cooling conditions after brazing heating of the method of the present invention were cooled in a temperature range from 600° C. to 400° C. by cooling rates of 10 and 20° C./min, so it was recognized that good results were obtained in each of the tensile strength after the brazing heating, the yield strength after the brazing heating, the erosion resistance after the brazing heating, and the electrical conductivity after the brazing heating.

Fin Material No. 15 of a comparative example had cooling conditions after brazing heating faster than the method of the present invention, so the electrical conductivity after the brazing was low.

Fin Material No. 16 of a comparative example was a DC cast slab rolled product and had cooling conditions after the brazing heating faster than the method of the present invention, so the yield strength and the electrical conductivity after the brazing were low.

Fin Material No. 10 of a comparative example was a DC cast slab rolled product and had cooling conditions after the brazing heating in the range of the method of the present invention, but despite this the yield strength and the electrical conductivity after the brazing were low.

INDUSTRIAL APPLICABILITY

According to the present invention, there are providing an aluminum alloy fin material for a heat exchanger having suitable strength before brazing enabling easy fin formation, having high strength after brazing, having a high thermal conductivity (electrical conductivity) after brazing, and having superior sag resistance, erosion resistance, self corrosion prevention, and sacrificial anode effect, a method of production of the same, and a method of production of a heat exchanger using the fin material are provided.

The invention claimed is:

1. An aluminum alloy fin material for a heat exchanger comprising
Si: 0.7 to 1.4 wt %, Fe: 0.80 to less than 1.20 wt %, Mn: 0.8 to 1.3 wt %, Zn: 0.5 to 2.5 wt %, Mg limited to 0.05 wt % or less, and the balance of unavoidable impurities and Al, and
having a tensile strength after brazing of 130 MPa or more, a yield strength after brazing of 45 MPa or more, a recrystallized grain size after brazing of 2200 μm or more, and an electrical conductivity after brazing of 47% IACS or more, and
wherein said aluminum alloy fin material has undergone brazing.

2. An aluminum alloy fin material for a heat exchanger
Si: 0.7 to 1.4 wt %, Fe: 0.80 to less than 1.20 wt %, Mn: 0.8 to 1.3 wt %, Zn: 0.5 to 2.5 wt %, Mg limited to 0.05 wt % or less, and the balance of unavoidable impurities and Al, and
having a yield strength after brazing of 49 MPa or more, a recrystallized grain size after brazing of 2200 μm or more, and an electrical conductivity after brazing of 47% IACS or more, and
wherein said aluminum alloy fin material has undergone brazing.

3. A method for preparing the aluminum alloy fin material for a heat exchanger of claim 1, comprising
pouring a melt having a chemical composition comprising Si: 0.7 to 1.4 wt %, Fe: 0.80 to less than 1.20 wt %, Mn: 0.8 to 1.3 wt %, Zn: 0.5 to 2.5 wt %, Mg limited to 0.05 wt % or less, and the balance of unavoidable impurities and Al,
continuously casting said melt by a twin-belt casting machine to a thin slab of a thickness of 5 to 10 mm,
winding said thin slab up into a roll,
performing first stage cold rolling to a sheet thickness of 1.0 to 6.0 mm,
performing primary intermediate annealing at 250 to 550° C.,
performing second stage cold rolling to a sheet thickness of 0.05 to 0.4 mm, performing secondary intermediate annealing at 360 to 550° C., and performing final cold rolling at a reduction of 20 to 75% to a final sheet thickness of 40 to 200 μm.

4. The method for preparing an aluminum alloy fin material for a heat exchanger of claim 3, wherein the primary intermediate annealing is performed by a continuous annealing furnace at a heating rate of 100° C./min or more and a holding temperature of 400 to 550° C. for a holding time of within 5 minutes.

5. An aluminum heat exchanger, comprising a fin material for a heat exchanger comprising:

Si: 0.7 to 1.4 wt %, Fe: 0.80 to less than 1.20 wt %, Mn: 0.8 to 1.3 wt %, Zn: 0.5 to 2.5 wt %, Mg limited to 0.05 wt % or less, and Al, and having a yield strength after brazing of 49 MPa or more, a recrystallized grain size after brazing of 2200 μm or more, and an electrical conductivity after brazing of 47% IACS or more, wherein said aluminum alloy fin material has undergone brazing, and wherein when the fin material has been cooled at a cooling rate of 10 to 50° C./min after being brazed, from a brazing temperature to 400° C.

* * * * *